United States Patent
Wright

(10) Patent No.: US 8,132,828 B2
(45) Date of Patent: Mar. 13, 2012

(54) APPARATUS AND METHOD FOR CONNECTING A CONTROL MODULE TO A STEERING COLUMN

(75) Inventor: James B. Wright, Sterling Heights, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 554 days.

(21) Appl. No.: 12/381,069

(22) Filed: Mar. 6, 2009

(65) Prior Publication Data

US 2010/0061797 A1 Mar. 11, 2010

Related U.S. Application Data

(60) Provisional application No. 61/191,556, filed on Sep. 11, 2008.

(51) Int. Cl.
*B62D 1/16* (2006.01)
*B62D 15/00* (2006.01)

(52) U.S. Cl. .............. 280/771; 200/61.54; 74/484 R; 74/492; 74/439; 74/15

(58) Field of Classification Search ............. 74/484 R, 74/492, 552; 280/771, 731; 200/61.54; 439/15, 439/34; 29/434
See application file for complete search history.

(56) References Cited

U.S. PATENT DOCUMENTS

| | | | |
|---|---|---|---|
| 3,877,319 A | 4/1975 | Cooper | |
| 4,404,438 A * | 9/1983 | Honjo | 200/61.54 |
| 4,571,469 A * | 2/1986 | Hanaki | 200/61.54 |
| 4,768,394 A * | 9/1988 | Mizuno et al. | 74/484 R |
| 4,888,456 A * | 12/1989 | Suzuki | 200/61.27 |
| 5,002,422 A | 3/1991 | Schremmer et al. | |
| 5,722,300 A | 3/1998 | Burkhard et al. | |
| 6,892,602 B2 | 5/2005 | Hirschfeld et al. | |
| 6,998,551 B2 * | 2/2006 | Baba et al. | 200/61.54 |
| 7,552,946 B2 * | 6/2009 | Kuerschner et al. | 280/779 |
| 7,571,664 B2 * | 8/2009 | Altmann et al. | 74/492 |
| 2008/0060469 A1 * | 3/2008 | Schuetz | 74/552 |

FOREIGN PATENT DOCUMENTS

| | | | |
|---|---|---|---|
| JP | 62-85762 A * | 4/1987 | |
| JP | 03-262742 A | 11/1991 | |
| JP | 08-188105 A | 7/1996 | |
| JP | 11-192887 A | 7/1999 | |

* cited by examiner

*Primary Examiner* — Ruth Ilan
(74) *Attorney, Agent, or Firm* — Tarolli, Sundheim, Covell & Tummino LLP

(57) ABSTRACT

An apparatus for connecting a steering column control module to a steering column of a vehicle comprises a bracket for mounting the steering column control module and a collet for interconnecting the bracket and the steering column. The collet snaps into engagement with the bracket and with the steering column. One of the bracket and the collet includes a first projection and the other of the bracket and the collet including a recess for receiving the first projection. The recess includes a second projection for engagement with the first projection when the first projection is received in the recess.

34 Claims, 4 Drawing Sheets

APPARATUS AND METHOD FOR CONNECTING A CONTROL MODULE TO A STEERING COLUMN

RELATED APPLICATION

This application claims priority from U.S. Provisional Application No. 61/191,556, filed Sep. 11, 2008.

TECHNICAL FIELD

The present invention relates to an apparatus and a method for connecting a steering column control module to a steering column of a vehicle and, more particularly, to an apparatus and a method for snapping a steering column control module into engagement with a steering column of a vehicle.

BACKGROUND OF THE INVENTION

It is known to provide a control module that is mounted on a steering column of a vehicle and that includes switches for various vehicle components, such as headlights, directional signals, and windshield wipers. Such a control module should be reliably and securely connected to the vehicle steering column. At the same time, the connection between the control module and the steering column should be readily achieved during vehicle assembly yet capable of being reversed to permit servicing or replacement of the control module.

A known device for connecting a control module to a vehicle steering column includes an outer plastic bracket and an inner cage formed of a number of elongated metal strips and a circular metal band. The outer plastic bracket carries the control module. The metal strips of the inner cage are arranged so as to be spaced apart around the circumference of the steering column. The circular metal band is attached to adjacent ends of the metal strips and maintains the metal strips in a circumferentially spaced apart arrangement. Each of the metal strips includes a bend that projects radially outwardly of the steering column. The bend engages an attachment feature on the outer plastic bracket. The cage also includes two die cast metal lugs that are carried by short metal strips. The short metal strips bias the lugs radially inwardly of the steering column to engage mounting features on the steering column. Relative axial movement between the outer plastic bracket and the inner metal cage places features on the bracket radially outward of the lugs to prevent the lugs from moving away from the steering column.

SUMMARY OF THE INVENTION

The present invention is directed to an apparatus and a method for connecting a steering column control module to a steering column of a vehicle and, more particularly, to an apparatus and a method for snapping a steering column control module into engagement with a steering column of a vehicle.

In accordance with one example embodiment of the present invention, an apparatus for connecting a steering column control module to a steering column of a vehicle comprises a bracket for mounting the steering column control module and a collet for interconnecting the bracket and the steering column. The collet snaps into engagement with the bracket and with the steering column. One of the bracket and the collet includes a first projection and the other of the bracket and the collet including a recess for receiving the first projection. The recess includes a second projection for engagement with the first projection when the first projection is received in the recess.

In accordance with another example embodiment of the present invention, an apparatus for connecting a steering column control module to a steering column of a vehicle comprises a bracket for mounting the steering column control module and a collet for interconnecting the bracket and the steering column. The collet snaps into engagement with the bracket and with the steering column. One of the bracket and the collet includes a projection and the other of the bracket and the collet includes a recess for receiving the projection. The other of the bracket and the collet has a length and a circumference. A first portion of the recess extends in a first direction along the length. A second portion of the recess extends in a second direction transverse to the first direction and partially around the circumference.

In accordance with a further example embodiment of the present invention, a method for connecting a steering column control module to a steering column of a vehicle comprises the steps of mounting the steering column control module to a bracket, snapping a collet into engagement with the bracket and snapping the collet into engagement with the steering column. The step of snapping a collet into engagement with the bracket includes the step of placing a first projection formed in one of the bracket and the collet into a first portion of a first recess formed in the other of the bracket and the collet. The first portion of the first recess extends in a first direction along a length of the other of the bracket and the collet.

In accordance with yet a further example embodiment of the present invention, a method for connecting a steering column control module to a steering column of a vehicle comprises the steps of mounting the steering column control module to a bracket, snapping a collet into engagement with the bracket, and snapping the collet into engagement with the steering column. The step of snapping a collet into engagement with the bracket includes the steps of placing a first projection formed in one of the bracket and the collet into a recess formed in the other of the bracket and the collet and snapping the first projection over a second projection formed in the recess.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
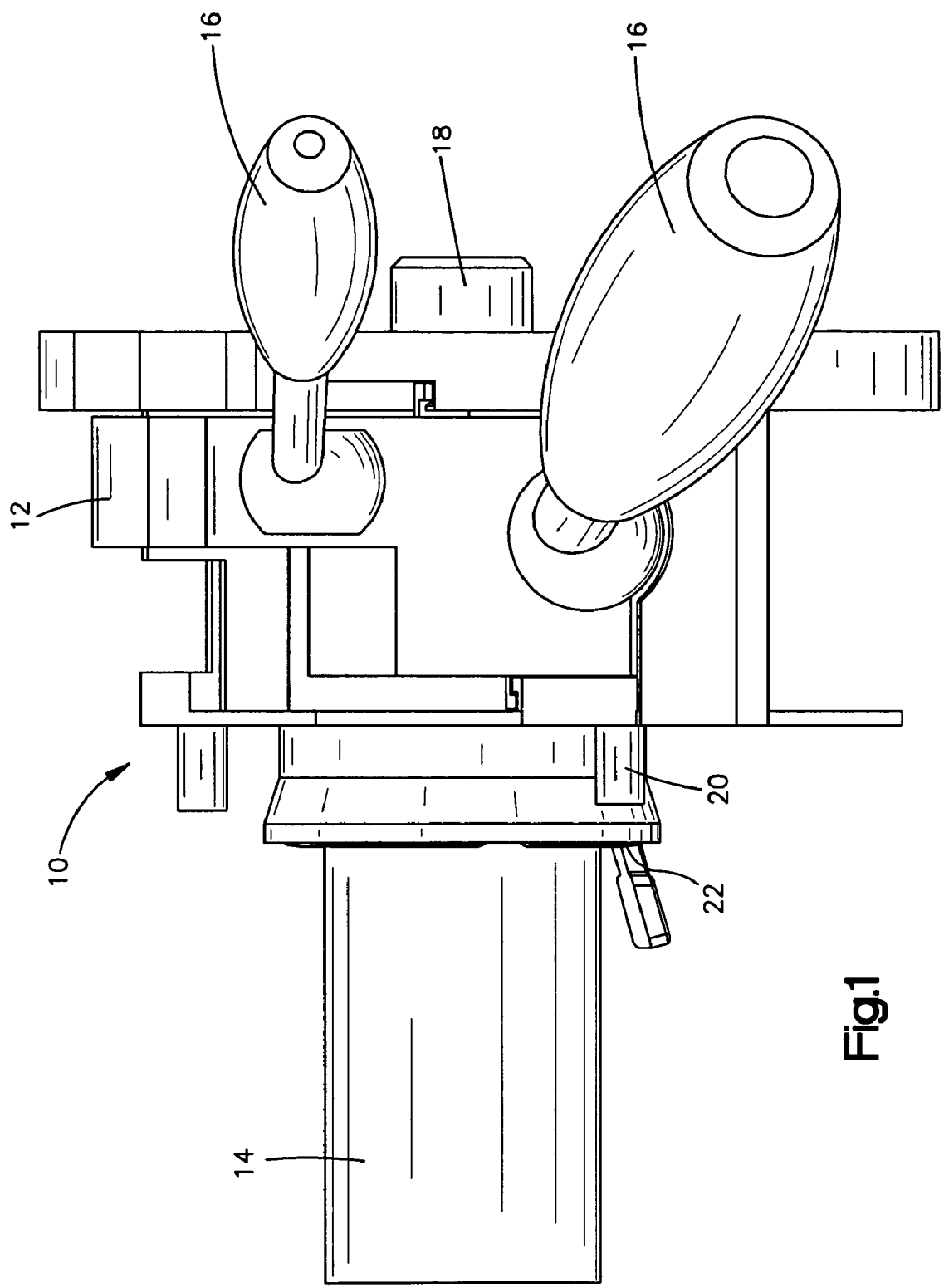
FIG. 1 is a side view of a steering column control module connected to a steering column using a representative embodiment of an apparatus constructed in accordance with the present invention.

FIG. 1 illustrates an apparatus 10 in accordance with a representative embodiment of the present invention for connecting a steering column control module 12 to a steering column 14 of a vehicle (not shown). The steering column control module 12 is an assembly that includes switches (not shown) for various vehicle components, such as headlights, directional signals, and windshield wipers. The switches are manually actuated by an operator of the vehicle using levers 16, which project from the steering column control module 12. The steering column 14 is an elongated, tubular member. The right end 18 (as viewed in FIG. 1) of the steering column 14 receives a steering wheel (not shown) for the vehicle.

Figure 2:
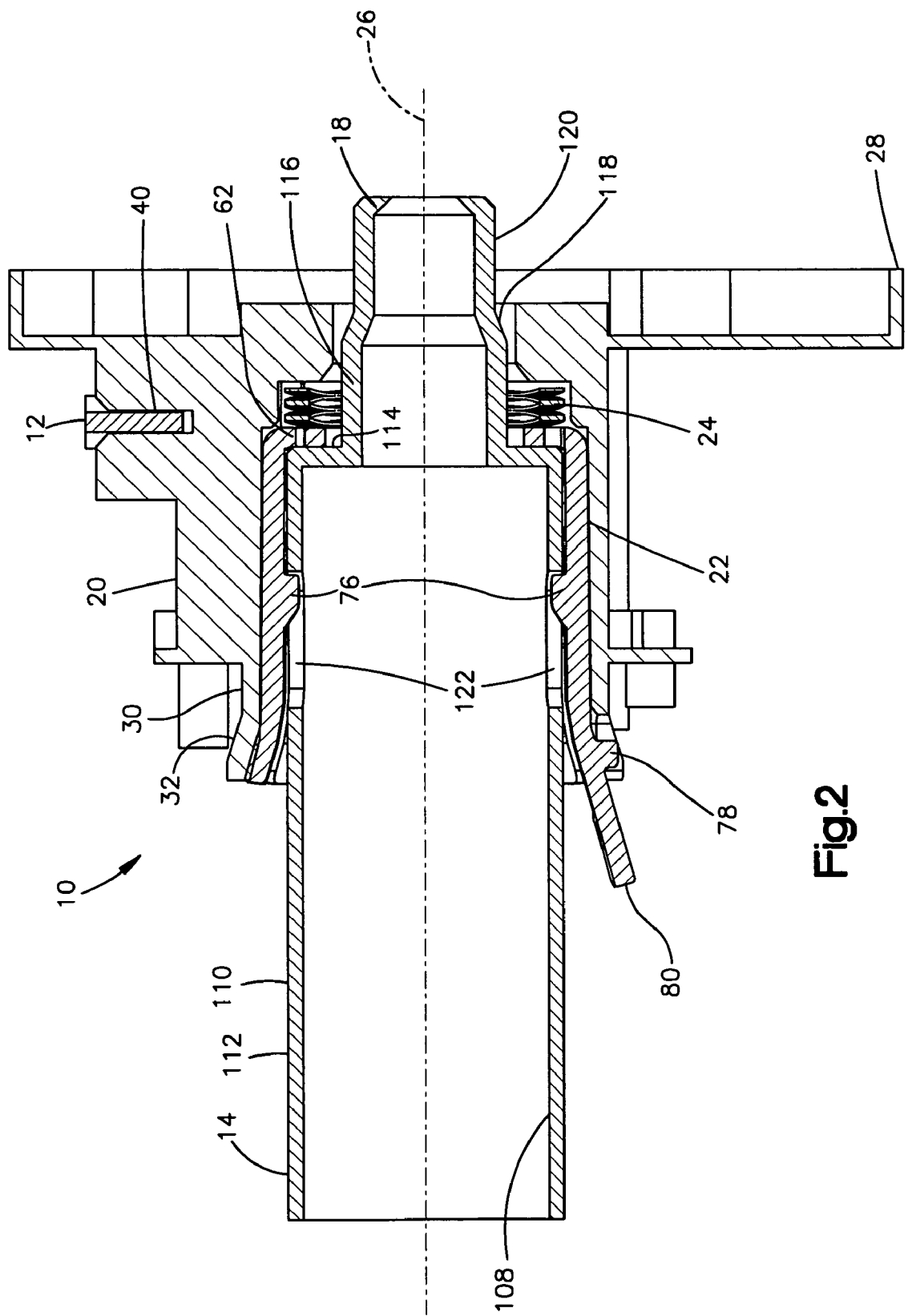
FIG. 2 is a sectional view of the apparatus of FIG. 1.

The apparatus 10 includes a bracket 20 and a collet 22, as best shown in FIG. 2. The apparatus 10 may also include a spring 24 (FIG. 2), such as an annular wave spring or coil spring. The bracket 20 mounts the steering column control module 12. The collet 22 interconnects the bracket 20 and the steering column 14. The collet 22 snaps into engagement with both the bracket 20 and the steering column 14.

The apparatus 10 has a longitudinally extending axis 26. The bracket 20 has a length in a direction substantially parallel to the axis 26. The bracket 20 may be formed of any suitable material, such as plastic, metal, or a combination of metal and plastic. One particular material that may be suitable for the bracket 20 is a glass-filled nylon. The bracket 20 may have any exterior shape suitable for mounting the steering column control module 12. As shown in FIG. 2, the right end of the bracket 20 may include an annular lip 28 that extends in a direction substantially parallel to the axis 26 toward the steering wheel (not shown) for the vehicle. The left end of the bracket 20, as viewed in FIG. 2, includes a tubular sleeve 30 that extends in a direction substantially parallel to the axis 26 away from the annular lip 28. The distal end portion 32 of the sleeve 30 flares radially outward from the remainder of the sleeve and from the axis 26. Between the lip 28 and the sleeve 30, the exterior of the bracket 20 may define a pocket 34 (FIG. 3) for receiving the steering column control module 12. The bracket 20 may also define slots 36 and 38 adjacent the pocket 34 for receiving mounting portions 40 of the steering column control module 12.

The bracket 20 also includes an interior surface 42 that extends in a direction generally parallel to the axis 26 and that may be concentric with the axis. The interior surface 42 is generally cylindrical in shape and defines an interior circumference of the bracket. The interior surface 42 also defines a passage 44, which extends in a direction generally parallel to the axis 26 and receives the collet 22. A first portion 46 of the interior surface 42 extends from the distal end portion 32 of the sleeve 30 for a major portion of the length of the bracket 20. The first portion 46 of the interior surface 42 is flared radially outwardly away from the axis 26 in the distal end portion 32 of the sleeve 30. A substantially cylindrical part 47 of the first portion 46 of the interior surface 42 extends from the flared part of the interior surface for the remainder of its length. A second portion 48 of the interior surface 42 extends radially inwardly from an end of the first portion 46 opposite the distal end portion 32 of the sleeve 30. A third portion 50 of the interior surface 42 extends from a radially inner end of the second portion 48 toward the right end of the bracket 20, as viewed in FIG. 2. The third portion 50 of the interior surface 42 may be substantially cylindrical for the majority of its length.

Figure 3:
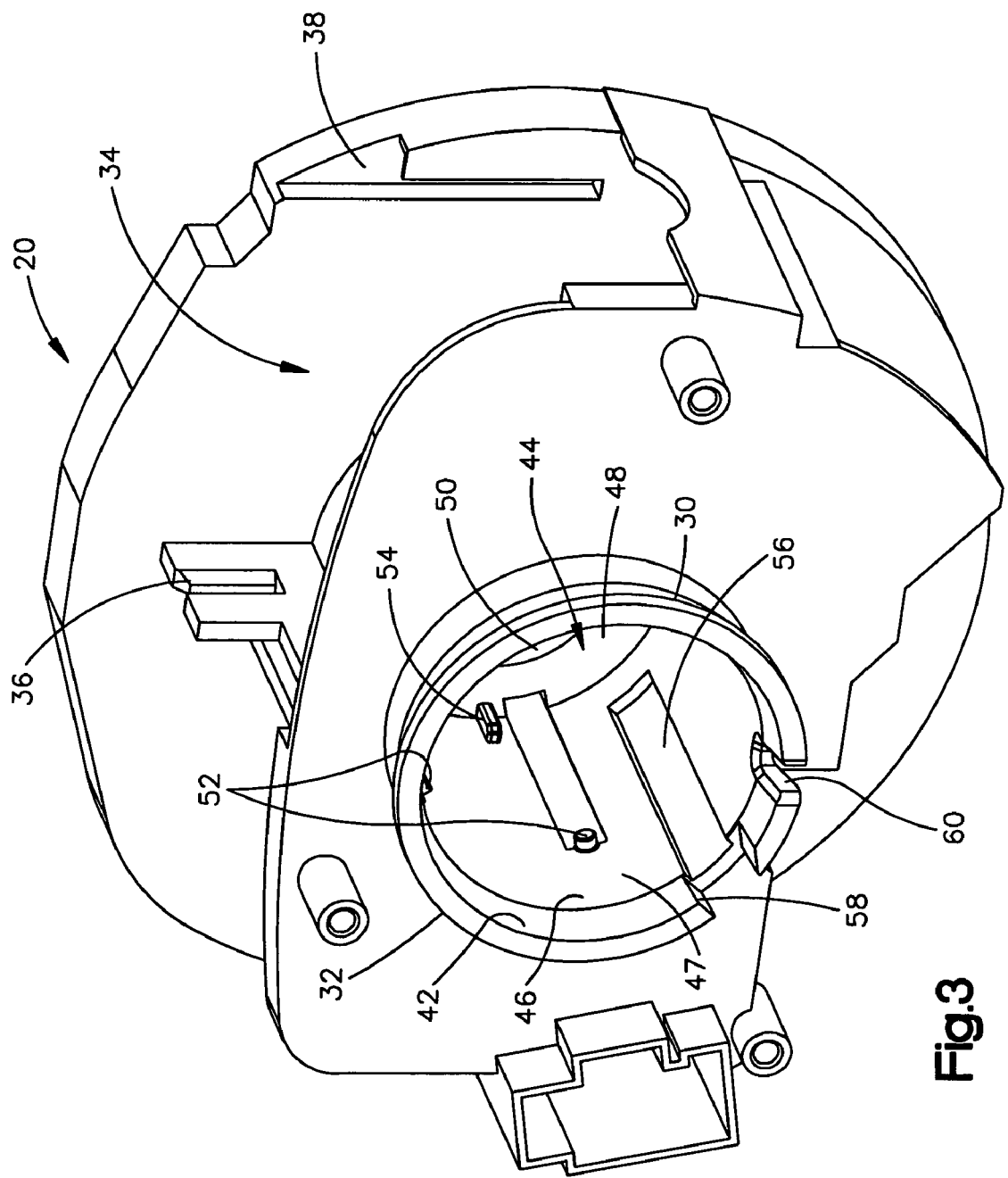
FIG. 3 is a perspective view of a bracket for the apparatus of FIG. 1.

The substantially cylindrical part 47 of the first portion 46 of the interior surface 42 has a substantially constant diameter that is greater than the diameter of the third portion 50 of the interior surface. In the distal end portion 32 of the sleeve 30, the first portion 46 of the interior surface 42 may flare radially outward in a manner similar to the outer surface of the sleeve. Four post-like projections 52, two of which are shown in FIG. 3, extend radially inwardly from the first portion 46 of the interior surface 42 toward the axis 26. The post-like projections 52 engage corresponding features of the collet 22 and are positioned on the interior surface 42 at locations selected to facilitate engagement with the collet. The post-like projections 52, which may be cylindrical in shape, are spaced apart around the circumference of the first portion 46 of the interior surface 42. At the end of the first portion 46 of the interior surface 42 adjacent the second portion 48 of the interior surface, four short ribs 54 extend radially inwardly from the first portion of the interior surface toward the axis 26. The short ribs 54, one of which is shown in FIG. 3, also extend from the second portion 48 of the interior surface 42 in a direction generally parallel to the axis 26.

Two recesses or grooves 56, one of which is shown in FIG. 3, extend lengthwise of the first portion 46 of the interior surface 42 from adjacent the distal end portion 32 of the sleeve 30 toward the second portion 48 of the interior surface. The grooves 56 receive corresponding features of the collet 22 when the collet and the bracket 20 are being connected to the steering column 14 and are positioned on the interior surface 42 at locations selected to facilitate such connection. The grooves 56 may be positioned around the circumference of the interior surface 42 so that two post-like projections 52 are located on each side of each of the grooves. As shown in FIG. 3, a recess or notch 58 is located at an end of one of the grooves 56. The notch 58 is formed in the distal end portion 32 of the sleeve 30 and is aligned with the associated groove 56. A second recess or notch 60 is also formed in the distal end portion 32 of the sleeve 30. The second notch 60 is spaced circumferentially away from the first notch 58 and is not aligned with either of the groves 56.

Figure 4:
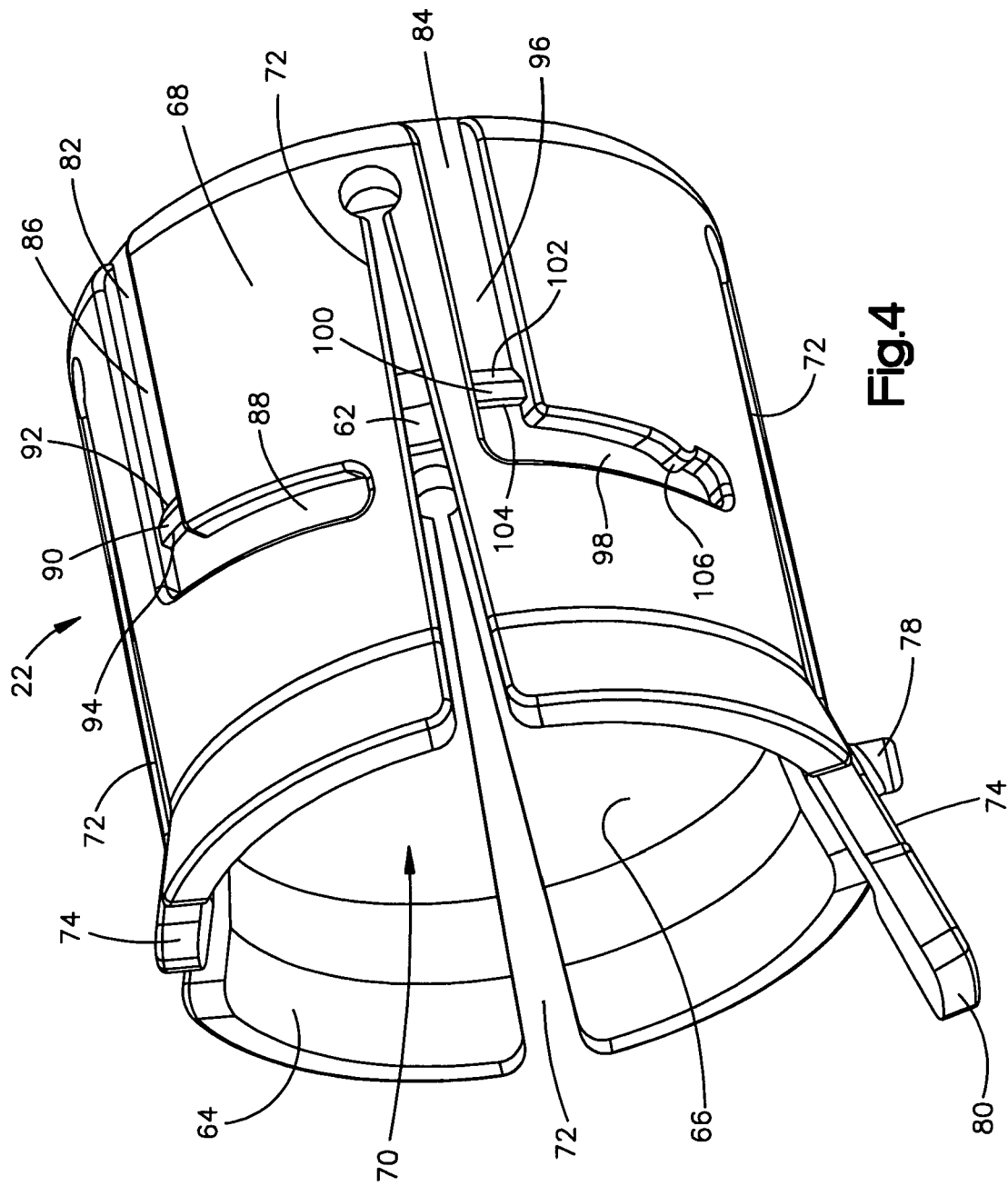
FIG. 4 is a perspective view of a collet for the apparatus of FIG. 1.

The collet 22 extends into the passage 44 of the bracket 20 when the apparatus 10 is assembled. The collet 22 has a length in a direction substantially parallel to the axis 26 and may be formed in one piece and of any suitable material, such as plastic or metal. One particular material that may be suitable is an acetyl plastic material, which may have inherent lubricity. The collet 22 is formed to be flexible and resilient so that portions of the collet may be deflected from their initial orientations and will then tend to return to their initial orientations. As shown in FIGS. 2 and 4, collet 22 has a generally tubular shape. The right end portion of the collet 22 may include an annular lip 62 that extends radially inwardly from the rest of the collet toward the axis 26. The left end portion 64 of the collet 22, as viewed in FIG. 2, flares radially outward from the rest of the collet.

The collet 22 includes an interior surface 66 and an exterior surface 68. Both the interior surface 66 and the exterior surface 68 extend in a direction generally parallel to the axis 26 and may be concentric with the axis. The interior surface 66 is generally cylindrical in shape with a radially outward flare in the left end portion 64 of the collet and. The interior surface 66 defines an interior circumference of the collet 22 and also a passage 70, which extends in a direction generally parallel to the axis 26 and receives the steering column 14. The exterior surface 68 is also generally cylindrical in shape with a radially outward flare in the left end portion 64 of the collet. The exterior surface 68 defines an exterior circumference of the collet 22.

Six slits 72 are formed in the collet 22 at circumferentially spaced apart locations. Each of the slits 72 extends lengthwise of the collet 22 from the flared left end portion 64, as viewed in FIG. 4, toward the lip 62. Each of the slits 72 also extends radially through the collet 22 from the interior surface 66 to the exterior surface 68. Each slit 72 tapers along its length from a greatest circumferential width adjacent the left end portion 64 of the collet 22 to a smallest circumferential width adjacent the lip 62. At its end adjacent the lip 62, each slit 72 enlarges into a small circular shape, which helps to relieve stress in the material of the collet 22 adjacent the end of the slit. The slits 72 help to provide flexibility for the collet 22 by allowing circumferentially adjacent portions of the collet to move relative to one another.

Four of the slits 72 are grouped in two pairs of slits that are relatively close together. Each of the two pairs of the slits 72 defines a snap finger 74. The two snap fingers 74 may be located at diametrically opposite positions on the circumference of the collet 22. The interior surface 66 of the collet 22 includes a projection 76 formed on each of the snap fingers 74. Each projection 76 extends radially inwardly from the interior surface 66 of the collet 22 toward the axis 26. The projections 76 engage corresponding features of the steering column 14 and are positioned and may be shaped to facilitate engagement with the steering column. The exterior surface 68 of the collet 22 includes a locking projection 78 formed on one of the snap fingers 74. The locking projection 78 may engage either the notch 58 or the notch 60 of the bracket 20 as the apparatus 10 is being assembled. The snap finger 74 that includes the locking projection 78 also includes an elongated release arm 80. The release arm 80 extends lengthwise of the collet 22 beyond the flared left end portion 64 of the collet and may be manipulated to help disconnect the steering column 14 from the apparatus 10.

Between the snap fingers 74, the exterior surface 68 includes a total of four recesses or grooves 82 and 84. The grooves 82 and 84 are spaced apart about the outer circumference of the collet 22. At least one slit 72 may be located between adjacent grooves 82 and 84. The grooves 82 and 84 extend from adjacent the lip 62 of the collet 22 toward the flared left end portion 64 of the collet. The grooves do not extend entirely through the collet from the exterior surface 68 to the interior surface 66. The grooves 82 are similar but not identical to the grooves 84. The two grooves 82 may be located diametrically opposite each other around the circumference of the collet 22. The two grooves 84 may similarly be located diametrically opposite each other around the circumference of the collet 22. The grooves 82 and 84 receive the post-like projections 52 that extend from the interior surface 42 of the bracket 20 when the bracket and the collet 22 are connected together.

A first portion 86 of each of the two grooves 82 extends from adjacent the lip 62 of the collet 22 in a direction substantially parallel to the axis 26. Approximately halfway along the length of the collet 22, the first portion 86 of each groove 82 ends at an intersection with a second portion 88 of the groove. The second portion 88 of each groove 82 extends in a direction transverse to the first portion 86 and partially around the circumference of the collet 22 toward an adjacent slit 72. The second portion 88 of each groove 82 also extends in a direction away from the lip 62 of the collet 22. The first portion 86 of each groove 82 may have substantially the same width as the second portion 88 of the groove. The first and second portions 86 and 88 of each groove 82 may also have substantially the same depth, except that the first portion 86 has a ramped projection 90 located adjacent the intersection of the first and second portions of the groove. The ramped projection 90 in the first portion 86 of each of the grooves 82 extends radially outwardly from the bottom of the groove. The ramped projection 90 has a gently sloping or ramped surface 92 presented toward the end of the groove 82 adjacent the lip 62 and an abrupt surface 94 presented toward the intersection of the first and second portions 86 and 88 of the groove. The abrupt surface 94 may be substantially perpendicular to a bottom surface of the groove 82.

A first portion 96 of each of the two grooves 84 extends from the adjacent the lip 62 of the collet 22 in a direction substantially parallel to the axis 26. Approximately halfway along the length of the collet 22, the first portion 96 of each groove 84 ends at an intersection with a second portion 98 of the groove. The second portion 98 of each groove 84 extends in a direction transverse to the first portion 96 of each groove and partially around the circumference of the collet 22 toward an adjacent slit 72. The second portion 98 of each groove 84 also extends in a direction away from the lip 62 of the collet 22. The first portion 96 of each groove 84 may have substantially the same width as the second portion 98 of the groove, except that the second portion 98 has a lateral projection 106 located adjacent the distal end of the second portion. The lateral projection 106 in the second portion 98 of each of the grooves 84 extends radially inwardly from a side wall that helps to define the groove. The first and second portions 96 and 98 of each groove 84 may also have substantially the same depth, except that the first portion 96 has a ramped projection 100 located adjacent the intersection of the first and second portions of the groove. The ramped projection 100 in the first portion 86 of each of the grooves 82 extends radially outwardly from the bottom of the groove. The ramped projection 100 has a gently sloping or ramped surface 102 presented toward the end of the groove 84 adjacent the lip 62 and an abrupt surface 104 presented toward the intersection of the first and second portions 96 and 98 of the groove. The abrupt surface 104 may be substantially perpendicular to a bottom surface of the groove 84.

The steering column 14 extends into the passage 70 of the collet 22 when the apparatus 10 is connected to the steering column. The steering column 14 has a length in a direction substantially parallel to the axis 26 and may be formed of any suitable material, such as metal. As shown in FIGS. 2 and 4, steering column 14 has a generally tubular shape. The right end 18 of the steering column 14 receives the steering wheel (not shown) for the vehicle. The steering column 14 has an interior surface 108 that extends in a direction generally parallel to the axis 26 and that may be concentric with the axis. The interior surface 108 is generally cylindrical in shape. The steering column 14 has an exterior surface 110 that extends in a direction generally parallel to the axis 26 and that may be concentric with the axis. The exterior surface 110 is generally cylindrical in shape and defines an exterior circumference of the steering column 14.

A first portion 112 of the exterior surface 110 extends for a major portion of the length of the steering column 14. A second portion 114 of the exterior surface 110 extends radially inwardly from an end of the first portion 112 nearer to the right end 18 of the steering column 14. A third portion 116 of the exterior surface 110 extends from a radially inner end of the second portion 114 toward the right end 18 of the steering column 14. A fourth portion 118 of the exterior surface 110 tapers radially inwardly from an end of the third portion 116 nearer to the right end 18 of the steering column 14. A fifth portion 120 of the exterior surface 110 extends from a radially inner end of the fourth portion 118 to the right end 18 of the steering column 14. Two recesses or slots 122 are formed in the steering column 14 at circumferentially spaced apart locations. Each of the slots 122 extends lengthwise of the steering column 14 in the first portion 112 of the exterior surface 110. Each of the slots 122 also extends radially through the steering column 14 from the exterior surface 110 to the interior surface 108. The slots 122 receive the projections 76 on the snap fingers 74 of the collet 22 when the collet and the bracket 20 are being connected to the steering column 14.

In a representative method for connecting the steering column control module 12 to the steering column 14, the steering column control module may first be mounted to the bracket 20 of the apparatus 10. The collet 22 may then be snapped into engagement with the bracket 20, and the collet may thereafter be snapped into engagement with the steering column 14.

More specifically, the steering column control module 12 may be placed in the pocket 34 formed in the exterior of the bracket 20 with mounting portions 40 of the steering column control module received in the slots 36 and 38 of the bracket. This step of the method for connecting the steering column control module 12 to the steering column 14 may be performed first or may be performed later in the method.

The spring 24 may then be placed in the passage 44 of the bracket 20. The spring 24 may be placed in the passage 44 so as to abut and lie against the second portion 48 of the interior surface 42 of the bracket 20. The spring 24 may be centered in the passage 44 by the short ribs 54 that extend from the first portion 46 of the interior surface 42 of the bracket 20.

The collet 22 may then be inserted into the passage 44 of the bracket 20. Before inserting the collet 22 into the passage 44, the collet is first oriented so that the snap fingers 74 of the collet are aligned with the grooves 56 in the interior surface 42 of the bracket. The collet 22 is also oriented so that the first portions 86 and 96 of the grooves 82 and 84, respectively, in the exterior surface 68 of the collet are aligned with the post-like projections 52 on the interior surface 42 of the bracket 20.

After the foregoing alignment, the collet 22 is moved axially into the passage 44 of the bracket 20 so that the post-like projections 52 slide into the first portions 86 and 96 of the grooves 82 and 84, respectively. When the post-like projections 52 have moved far enough along the first portions 86 and 96 of the grooves 82 and 84, respectively, the post-like projections 52 contact the ramped projections 90 and 100 in the grooves. The post-like projections 52 then move up the ramped surfaces 92 and 102 of the ramped projections 90 and 100. The collet 22 resiliently deflects away from the bracket 20 and toward the axis 26 to facilitate the movement of the post-like projections 52 up the ramped surfaces 92 and 102 of the ramped projections 90 and 100, respectively. Further movement of the collet 22 relative to the bracket 20 causes the post-like projections 52 to travel over the abrupt surfaces 94 and 104 of the ramped projections 90 and 100. As a result, the collet 22 resiliently snaps back from its deflected condition The post-like projections 52 then restrict movement of the collet out of the passage 44 due to interference between the post-like projections 52 and the abrupt surfaces 94 and 104 of the ramped projections 90 and 100, respectively. The spring 24 is also retained between the lip 62 of the collet 22 and the second portion 48 of the interior surface 42 of the bracket 20.

The steering column 14 may now be inserted into the passage 70 in the collet 22. Before inserting the steering column 14 into the passage 70, the steering column is first oriented so that the slots 122 in the steering column are aligned with the projections 76 on the snap fingers 74 of the collet 22. After the foregoing alignment, the steering column 14 is moved axially into the passage 70 of the collet 22 adjacent the flared left end portion 64 of the collet. The steering column 14 is moved through the passage 70 toward the lip 62 of the collet and the annular lip 28 of the bracket. The right end 18 of the steering column 14 passes beyond the lip 62 of the collet and through the spring 24. During this initial axial movement of the steering column 14, the steering column may not contact the interior surface 66 of the collet 22 or the interior surface 42 of the bracket 20.

When the projections 76 first engage the first portion 112 of the exterior surface of the steering column 14, the snap fingers 74 of the collet 22 resiliently deflect away from the steering column 14 and the axis 26 to facilitate the movement of the steering column into the passage 70. Because the snap fingers 74 of the collet 22 are aligned with the grooves 56 in the interior surface 42 of the bracket, the grooves 56 provide spaces into which the snap fingers can deflect. As the steering column 14 continues to be moved into the passage 70, the projections 76 slide along the first portion 112 of the exterior surface 110 of the steering column toward the slots 122. When the movement of the steering column 14 into the passage 70 is sufficient for the projections 76 to be radially outward of the slots 122, the snap fingers 74 of the collet 22 resiliently snap back from their deflected conditions so that the projections 76 enter the slots 122. The interference or engagement between the projections 76 and the surfaces of the steering column 14 that define the slots 122 restricts movement of the steering column out of the passage 70. The interference or engagement between the projections 76 and the surfaces of the steering column 14 that define the slots 122 also restricts rotation of the steering column relative to the collet 22.

The bracket 20 and the collet 22 may now be locked to the steering column 14. Locking is achieved by rotating the bracket 20 relative to the steering column 14 and the collet 22. The rotation is in a direction to cause the post-like projections 52 of the bracket 20 to move along the second portions 88 and 98 of the grooves 82 and 84, respectively, in the exterior surface 68 of the collet 22. Because the second portions 88 and 98 of the grooves 82 and 84, respectively, extend both partially around the circumference of the collet 22 and in a direction away from the lip 62 of the collet, movement of the post-like projections 52 along the second portions 88 and 98 of the grooves 82 and 84 draws the collet further into the passage 44 of the bracket 20. This causes the flared left end portion 64 of the collet 22 to be drawn into contact with the substantially cylindrical part 47 of the first portion 46 of the interior surface 42 of the bracket 20. The interior surface 42 of the bracket 20 presses the flared left end portion 64 of the collet 22 toward the axis 26 so that the collet clamps against the exterior surface 110 of the steering column 14. The rotation of the bracket 20 relative to the steering column 14 and the collet 22 also causes the snap fingers 74 of the collet 22 to rotate out of alignment with the grooves 56 in the interior surface 42 of the bracket 20. As a result, the snap fingers 74 no longer are able to deflect away from the steering column 14 and the axis 26, and the projections 76 on the snap fingers are prevented from moving out of the slots 122 in the steering column.

When the bracket 20 has been rotated through a sufficient angle relative to the steering column 14, such as 40°, for example, the post-like projections 52 of the bracket that are traveling along the grooves 84 reach the lateral projections 106 adjacent the distal ends of the second portions 98 of the grooves. Further rotation of the bracket 20 relative to the steering column 14 causes those post-like projections 52 to deflect the lateral projections 106 and move into the ends of the second portions 98 of the grooves 84. As a result, the lateral projections 106 restrict movement of the post-like projections 52 out of the distal ends of the second portions 98 of the grooves 84. At the same time, the locking projection 78 on one of the snap fingers 74 moves into alignment with and resiliently snaps into engagement with the notch 60 in the distal end portion 32 of the sleeve 30 of the bracket 20. The engagement between the locking projection 78 and the sleeve 30 prevents the bracket 20 from rotating in the opposite direction relative to the steering column 14 and unlocking the bracket from the steering column. The spring 24, which may be compressed between the lip 62 of the collet 22 and the second portion 48 of the interior surface 42 of the bracket 20, may provide a spring bias to help prevent relative movement between the collet and the bracket in a direction generally parallel to the axis 26.

When the steering column 14 is fully inserted in the passage 70 of the collet 22, the right end 18 of the steering column and the fifth portion 120 of the exterior surface 110 project from the right end of the bracket 20. The fourth portion 118 of the exterior surface 110 of the steering column 14 may be radially adjacent the third portion 50 of the interior surface 42 of the bracket 20. The third portion 116 of the exterior surface 110 of the steering column 14 may be radially adjacent and inward of the spring 24. The second portion 114 of the exterior surface 110 of the steering column 14 may be adjacent the lip 62 of the collet 22. The first portion 112 of the exterior surface 110 of the steering column 14 may be adjacent the interior surface 66 of the collet 22.

To release the steering column 14 from the bracket 20 and the collet 22, the release arm 80 at the end of the snap finger 74 may be manipulated to move the locking projection 78 out of the notch 60 in a direction toward the axis 26. The bracket 20 may then be rotated relative to the collet 22 and the steering column 14 to unlock the bracket and the collet from the steering column 14. The steering column 14, the bracket 20, and the collet 22 may then be disconnected from one another by reversing the steps of the method described above.

From the above description of the invention, those skilled in the art will perceive improvements, changes and modifications. For example, the bracket 20 may additionally or alternatively have grooves in its interior surface 42 similar to the grooves 82 and 84 in the exterior surface 68 of the collet 22, and the exterior surface of the collet may additionally or alternatively have projections similar to the post-like projections 52 on the interior surface of the bracket. Similarly, the steering column 14 may additionally or alternatively have projections on its exterior surface 110 similar to the projections 76 on the interior surface 66 of the collet 22, and the collet may additionally or alternatively have slots in its interior surface similar to the slots 122 in the exterior surface of the steering column. Such improvements, changes and modifications within the skill of the art are intended to be covered by the appended claims.

Having described the invention, the following is claimed:

1. Apparatus for connecting a steering column control module to a steering column of a vehicle comprising:
    a bracket for mounting the steering column control module; and
    a collet for interconnecting the bracket and the steering column, the collet snapping into engagement with the bracket and with the steering column,
    one of the bracket and the collet including a first projection and the other of the bracket and the collet including a recess for receiving the first projection, the recess including a second projection for engagement with the first projection when the first projection is received in the recess.

2. Apparatus according to claim 1 wherein the other of the bracket and the collet has a length and a circumference and wherein a first portion of the recess extends in a first direction along said length and a second portion of the recess extends in a second direction transverse to the first direction and partially around said circumference.

3. Apparatus according to claim 2 wherein the first portion of the recess includes the second projection and the second portion of the recess includes a third projection for engagement with the first projection when the first projection is received in the second portion of the recess.

4. Apparatus according to claim 2 wherein the recess is a first recess, the one of the bracket and the collet including a second projection and the other of the bracket and the collet including a second recess for receiving the second projection.

5. Apparatus according to claim 4 wherein the second projection and the second recess are located relative to each other so that when the first projection is received in the second portion of the first recess, the second projection is receivable in the second recess to restrict movement of the first projection along the second portion of the first recess.

6. Apparatus according to claim 1 wherein one of the steering column and the collet includes a projection and the other of the steering column and the collet includes a recess for receiving the projection.

7. Apparatus according to claim 1 wherein the bracket is removable from the steering column after the collet interconnects the bracket and the steering column.

8. Apparatus according to claim 1 wherein the collet includes a longitudinally extending slit to permit portions of the collet to move relative to one another.

9. Apparatus according to claim 8 wherein the collet has a length and a circumference and the slit extends from an end of the collet along the length of the collet to permit circumferentially adjacent portions of the collet to move relative to one another and thereby to permit the first projection to snap over the second projection.

10. Apparatus according to claim 1 wherein the bracket includes the first projection and the collet includes the recess for receiving the first projection.

11. Apparatus for connecting a steering column control module to a steering column of a vehicle comprising:
    a bracket for mounting the steering column control module; and
    a collet for interconnecting the bracket and the steering column, the collet snapping into engagement with the bracket and with the steering column,
    one of the bracket and the collet including a projection and the other of the bracket and the collet including a recess for receiving the projection, the other of the bracket and the collet having a length and a circumference, a first portion of the recess extending in a first direction along said length and a second portion of the recess extending in a second direction transverse to the first direction and partially around said circumference.

12. Apparatus according to claim 11 wherein the projection is a first projection and wherein the recess includes a second projection for engagement with the first projection when the first projection is received in the recess.

13. Apparatus according to claim 12 wherein the first portion of the recess includes the second projection and the second portion of the recess includes a third projection for engagement with the first projection when the first projection is received in the second portion of the recess.

14. Apparatus according to claim 11 wherein the projection is a first projection and the recess is a first recess, the one of the bracket and the collet including a second projection and the other of the bracket and the collet including a second recess for receiving the second projection.

15. Apparatus according to claim 14 wherein the second projection and the second recess are located relative to each other so that when the first projection is received in the second portion of the first recess, the second projection is receivable in the second recess to restrict movement of the first projection along the second portion of the first recess.

16. Apparatus according to claim 11 wherein one of the steering column and the collet includes a projection and the other of the steering column and the collet includes a recess for receiving the projection.

17. Apparatus according to claim 11 wherein the bracket is removable from the steering column after the collet interconnects the bracket and the steering column.

18. Apparatus according to claim 11 wherein the collet includes a longitudinally extending slit to permit portions of the collet to move relative to one another.

19. Apparatus according to claim 18 wherein the collet has a length and a circumference and the slit extends from an end of the collet along the length of the collet to permit circumferentially adjacent portions of the collet to move relative to one another and thereby to permit the first projection to snap over the second projection.

20. Apparatus according to claim 11 wherein the bracket includes the projection and the collet includes the recess for receiving the projection.

21. A method for connecting a steering column control module to a steering column of a vehicle comprising the steps of:
mounting the steering column control module to a bracket;
snapping a collet into engagement with the bracket; and
snapping the collet into engagement with the steering column,
the step of snapping a collet into engagement with the bracket including the step of placing a first projection formed in one of the bracket and the collet into a first portion of a first recess formed in the other of the bracket and the collet, the first portion of the first recess extending in a first direction along a length of the other of the bracket and the collet.

22. The method according to claim 21 further comprising the step of locking the bracket and the collet to the steering column.

23. The method according to claim 22 wherein the step of locking the bracket and collet to the steering column includes the step of rotating the bracket and collet relative to one another so that the first projection moves from the first portion of the first recess into a second portion of the first recess, the second portion of the first recess extending in a second direction transverse to the first direction and partially around a circumference of the other of the bracket and the collet.

24. The method according to claim 23 wherein the step of locking the bracket and collet to the steering column also includes the step of placing a second projection formed in the one of the bracket and the collet into a second recess formed in the other of the bracket and the collet so that when the first projection is received in the second portion of the first recess, the second projection is received in the second recess to restrict movement of the first projection along the second portion of the first recess.

25. The method according to claim 24 wherein the step of locking the bracket and collet to the steering column further includes the step of snapping the first projection over a third projection formed in the second portion of the first recess.

26. The method according to claim 21 wherein the step of snapping a collet into engagement with the bracket includes the step of snapping the first projection over a second projection formed in the recess.

27. The method according to claim 21 wherein the step of snapping a collet into engagement with the bracket also includes the step of snapping the first projection over a second projection formed in the first portion of the first recess.

28. A method for connecting a steering column control module to a steering column of a vehicle comprising the steps of:
mounting the steering column control module to a bracket;
snapping a collet into engagement with the bracket; and
snapping the collet into engagement with the steering column,
the step of snapping a collet into engagement with the bracket including the steps of placing a first projection formed in one of the bracket and the collet into a recess formed in the other of the bracket and the collet and snapping the first projection over a second projection formed in the recess.

29. The method according to claim 28 wherein the step of placing a first projection into a recess includes the step of placing the first projection into a first portion of a first recess formed in the other of the bracket and the collet, the first portion of the first recess extending in a first direction along a length of the other of the bracket and the collet.

30. The method according to claim 28 further comprising the step of locking the bracket and the collet to the steering column.

31. The method according to claim 30 wherein
the step of placing a first projection into a recess includes the step of placing the first projection into a recess includes the step of placing the first projection into a first portion of a first recess formed in the other of the bracket and the collet, the first portion of the first recess extending in a first direction along a length of the other of the bracket and the collet, and
the step of locking the bracket and collet to the steering column includes the step of rotating the bracket and collet relative to one another so that the first projection moves from the first portion of the recess into a second portion of the recess, the second portion of the first recess extending in a second direction transverse to the first direction and partially around a circumference of the other of the bracket and the collet.

32. The method according to claim 31 wherein the step of locking the bracket and collet to the steering column also includes the step of placing a third projection formed in the one of the bracket and the collet into a second recess formed in the other of the bracket and the collet so that when the first projection is received in the second portion of the first recess, the third projection is received in the second recess to restrict movement of the first projection along the second portion of the first recess.

33. The method according to claim 31 wherein the step of locking the bracket and collet to the steering column further includes the step of snapping the first projection over a third projection formed in the second portion of the first recess.

34. The method according to claim 28 wherein the step of snapping a collet into engagement with the bracket also includes the step of snapping the first projection over a third projection formed in the first portion of the first recess.

* * * * *